United States Patent [19]

Hopkins

[11] Patent Number: 4,653,952
[45] Date of Patent: Mar. 31, 1987

[54] FABRICATED TEE

[76] Inventor: Kenneth N. Hopkins, 1455 Black Oak Dr., Centerville, Ohio 45459

[21] Appl. No.: 770,119

[22] Filed: Aug. 28, 1985

[51] Int. Cl.$^4$ .............................................. F16B 7/08
[52] U.S. Cl. ................................... 403/233; 403/206; 403/213; 403/235; 403/265
[58] Field of Search ............... 403/233, 206, 213, 235, 403/233, 237, 234, 191, 403, 270, 267, 265; 228/182, 173.4, 173.5; 248/230, 219.2; 285/286

[56] References Cited

U.S. PATENT DOCUMENTS

| | | | |
|---|---|---|---|
| 891,100 | 6/1908 | Rankin | 403/191 |
| 1,048,364 | 12/1912 | Smith . | |
| 1,301,417 | 4/1919 | Franklin | 403/235 |
| 1,809,408 | 1/1931 | Goeller . | |
| 1,822,389 | 9/1931 | Blakely | 403/265 X |
| 1,986,735 | 1/1935 | Mack | 173/273 |
| 2,024,782 | 12/1935 | Schwinn | 403/237 |
| 2,299,143 | 10/1942 | Hellwig | 403/270 |
| 3,527,361 | 9/1970 | Janetka | 403/237 |
| 3,972,639 | 8/1976 | Lening | 403/191 |
| 4,526,348 | 7/1985 | Cammack | 403/233 X |

FOREIGN PATENT DOCUMENTS

| | | | |
|---|---|---|---|
| 583828 | 11/1924 | France | 403/234 |
| 111722 | 5/1959 | Netherlands | 403/233 |
| 358998 | 6/1962 | Sweden | 403/237 |

Primary Examiner—Cornelius J. Husar
Assistant Examiner—Joseph A. Fischetti
Attorney, Agent, or Firm—Bobby D. Scearce; Donald J. Singer

[57] ABSTRACT

An improved welded structural joint in the form of a fabricate tee and method for making same is described which comprises a transverse member and a strut member abutting at one end to the transverse member intermediate its ends, and one or a pair of U members disposed around and welded to the transverse and strut members, each U member having an arcuate portion intermediate its ends conforming to the outer surface contour of the transverse member and a pair of straight portions near its ends defining a pair of parallel legs having predetermined length and spacing and being welded lengthwise to the strut member. The transverse and strut members may be solid or tubular and of circular, rectangular or other suitable cross section, and of substantially any respective size. The longitudinal axes of the transverse and strut members may intersect at substantially any angle, or the members may be joined tangentially. The transverse and strut members may comprise tubular segments having respective predetermined inner diameters for receiving cylindrical structural members having corresponding outer diameters and joined together using bolts or pins. The U member may comprise a flat strap of suitable width to cover the abutting end of the strut member.

9 Claims, 19 Drawing Figures

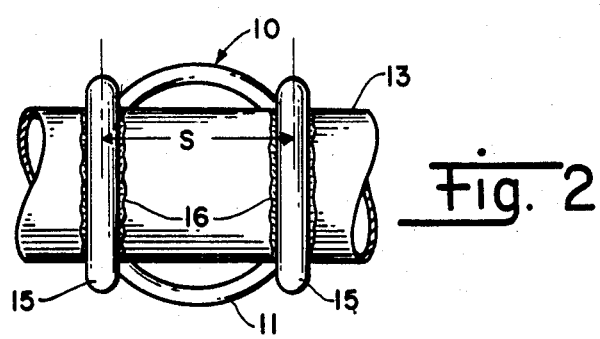
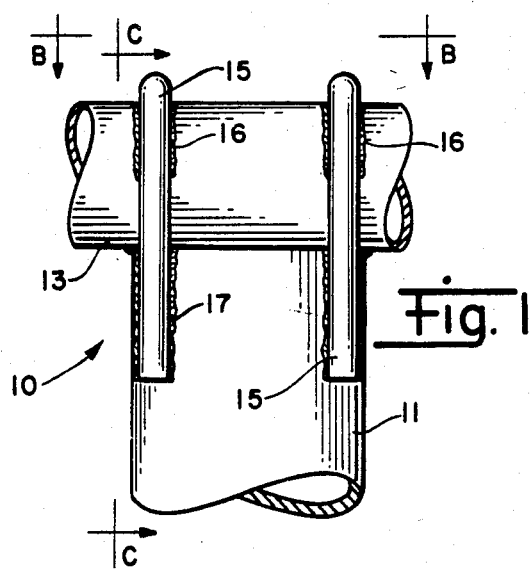
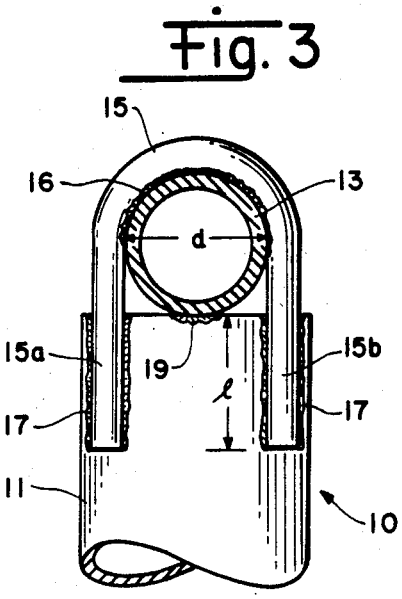
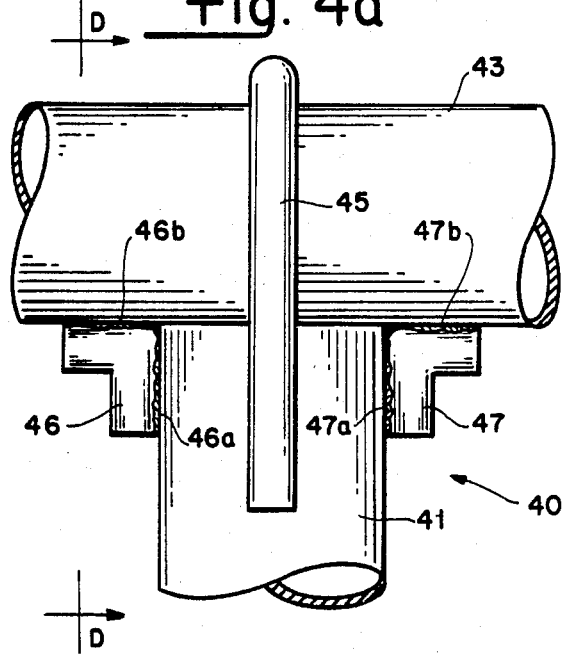
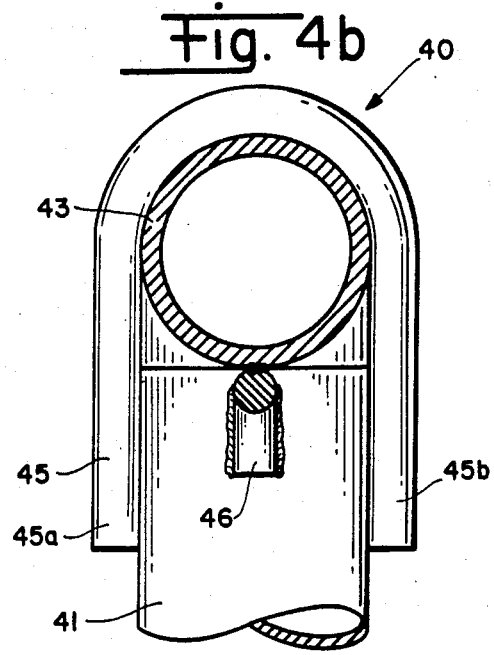

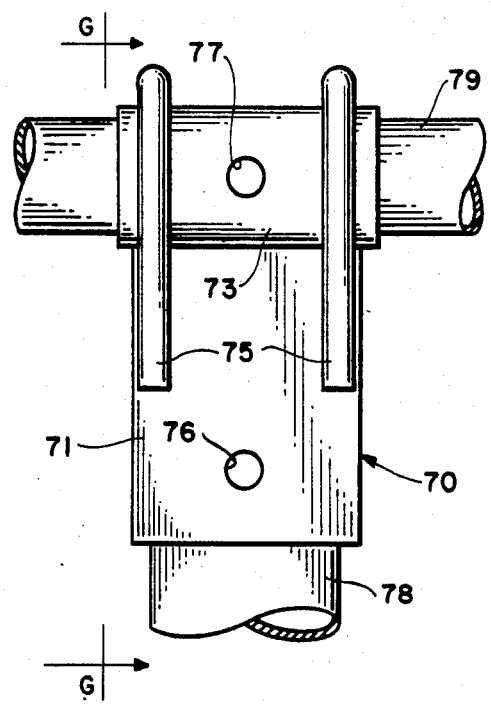
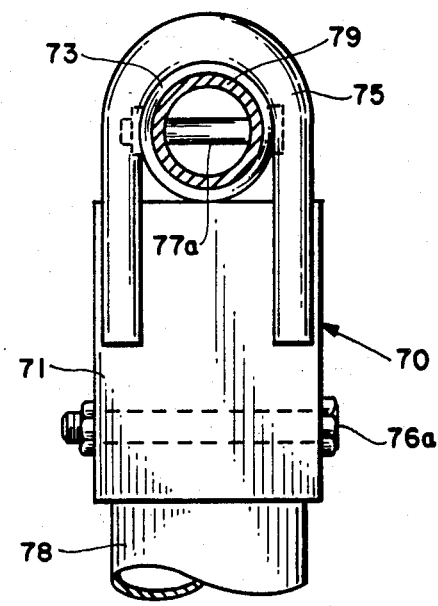
Fig. 7a  Fig. 7b
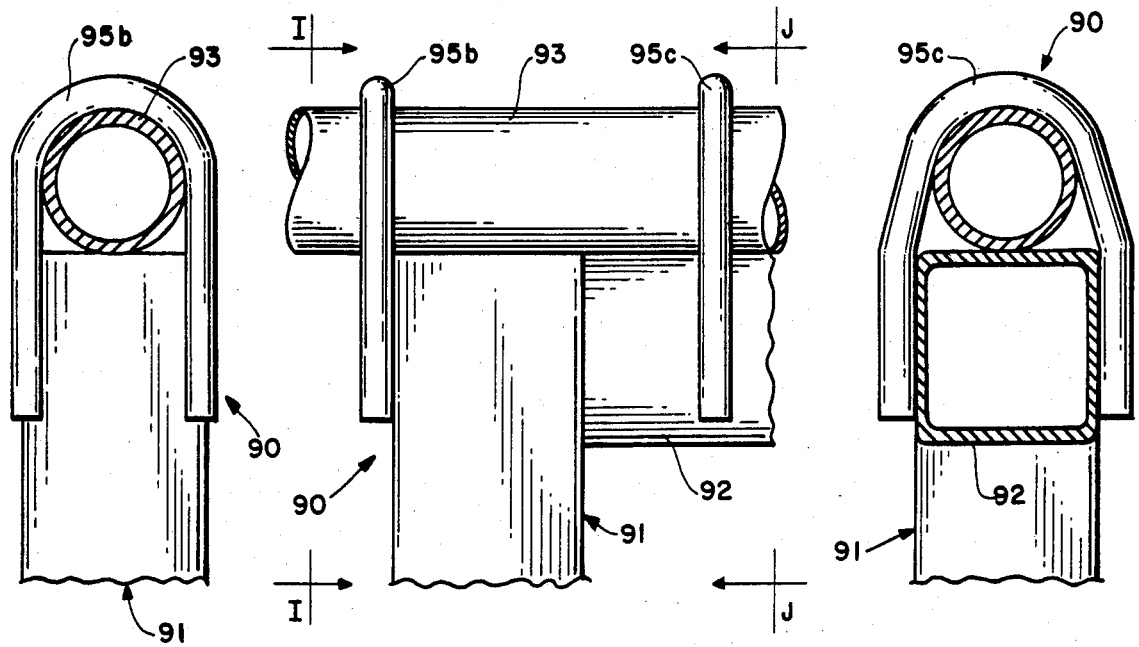
Fig. 9b  Fig. 9a  Fig. 9c

FABRICATED TEE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to structural metal joint configurations and methods of joining structural members, and more particularly to novel welded tee joints between structural members at least one of which is cylindrical in shape.

Structural tees, welded joints, and other configurations for joining a pair of structural elements in substantial transverse abutting relationship to each other find widespread use in temporary or permanent framework in a multiplicity of applications related to construction equipment including scaffolding, roadway and bridge building forms, and the like, and to fences and railings, to equipment implements, lifts and stands, to structural supports for mining operations, and to industrial machinery and material handling equipment. In the prior art, a variety of configurations exist for joining a pair of cylindrical structural elements, and particularly a pair of cylindrical tubular elements, including hollow cast or forged tees, die cut or drilled and welded configurations, contour or bias cut and welded joints, and the like. Each of these configurations suffer one or more drawbacks rendering each unsuitable for general application. For example, a cast tee provides certain economies in large scale production, but is in general structurally weak. A cast tee may be especially unsuitable for a joint which is subjected to substantial twisting, tension, bending or shock loads; cast tees are generally limited to fluid flow applications. A forged tee overcomes the inherent structural weakness of the cast tee but is characterized by relatively high cost and may be limited in availability in a desired size and geometry.

In the fabrication of a punched or drilled and welded joint, a tee of structural quality may be provided by punching or drilling a hole of predetermined diameter through the wall of a tubular member comprising a transverse member for the tee, inserting the abutting member and welding the two members to form a tee. The special equipment required to punch or to drill through the wall of the transverse member is expensive and not readily available, especially in the fabrication of joints including abutting members of different diameters. Such a joint cannot be made between members wherein a transverse bearing member has a diameter smaller than that of the abutting strut, and the punched and welded joint cannot be made between two solid abutting members; a punched and welded joint is especially unsuitable when the inside surface of the transverse member must retain its integrity, such as to function as a bearing member to receive a smaller diameter cylinder, because the abutting strut member penetrates the wall of the bearing member.

In the fabrication of a contour bias cut and and welded joint, the end of an abutting strut member is cut to conform to the outside surface of the transverse member, and requires careful welding to provide a quality joint. Consequently, the fabrication of this type of joint is unduly time consuming and often results in a joint which is neither square nor structurally sound.

A bias cut and welded joint is formed by making two 45° cuts on the end of the abutting strut member to form two points, and cutting the transverse member to form a notch to receive the strut. Without specialized equipment, substantial problems are encountered in making the two cuts to produce a square joint, and a tubular transverse bearing member in a fabricated joint may not provide an acceptable inner bearing surface without substantial dressing of the inner surface after welding is complete.

The present invention eliminates or substantially reduces in critical importance the foregoing problems in the prior art by providing a joint structure in the form of a fabricated tee and method of fabrication therefor, the fabricated tee characterized by substantial strength and by economy and ease of fabrication.

It is therefore a principal object of the present invention to provide an improved welded structural tee joint between two abutting structural members at least one of which is cylindrical in shape.

It is a further object of the invention to provide an improved welded structural tee joint between two abutting cylindrical or tubular members of substantially any size and wall thickness.

Another object of the invention is to provide a welded joint in which the structural members abut at an angle other than 90°.

Another object of the invention is to provide an improved welded joint between cylindrical members of different diameters.

Another object of the invention is to provide an improved welded joint between abutting members having different cross sections.

Yet another object of the invention is to provide an improved welded joint between abutting members having respective longitudinal axes of symmetry which do not intersect.

Another object of the invention is to provide a welded structural joint wherein a tubular transverse bearing member may receive a smaller diameter cylinder to form a bearing.

Another object of the invention is to provide an improved method of fabricating a welded structural joint.

These and other objects of the present invention will become apparent as the detailed description of certain representative embodiments thereof proceeds.

SUMMARY OF THE INVENTION

In accordance with the foregoing principles and objects of the present invention, an improved welded structural joint in the form of a fabricated tee and method for making same is described which comprises a transverse member and a strut member abutting at one end to the transverse member intermediate its ends, and one or a pair of U members disposed around and welded to the transverse and strut members, each U member having an arcuate portion intermediate its ends conforming to the outer surface contour of the transverse member and a pair of straight portions near its ends defining a pair of parallel legs having predetermined length and spacing and being welded lengthwise to the strut member. The transverse and strut members may be solid or tubular and of circular, rectangular or other suitable cross section, and of substantially any respective size. The longitudinal axes of the transverse and strut members may intersect at substantially any angle, or the members may be joined tangentially. The transverse and strut members may comprise tubular segments having respective predetermined inner diameters for receiving cylindrical structural members having corresponding outer diameters and joined together using bolts or pins. The U member may comprise a flat strap of suitable width to cover the abutting end of the strut member.

DESCRIPTION OF THE DRAWINGS

The present invention will be more clearly understood from the following detailed description of representative embodiments thereof read in conjunction with the accompanying drawings wherein:

FIG. 1 is an elevational view of a fabricated tee of the present invention in one representative embodiment wherein two cylindrical structural members of different diameters are joined;

FIG. 2 is a view along line B—B of FIG. 1;

FIG. 3 is a view along line C—C of FIG. 1;

FIG. 4a is an elevational view of a tee similar to the FIG. 1 embodiment, wherein two cylindrical structural members of equal diameters are joined;

FIG. 4b is a view along line D—D of FIG. 4a;

FIG. 5b is a view along line E—E of FIG. 5a;

FIG. 7a is an elevational view of a fabricated tee in the form of a structural hinge comprising a short strut segment joined to a short bearing member segment;

FIG. 7b is a view along line G—G of FIG. 7a;

FIG. 8b is a view along line H—H of FIG. 8a;

FIG. 9a is an elevational view of a fabricated tee wherein a strut includes a section parallel to the bearing member;

FIG. 9b is a view along line I—I of FIG. 9a;

FIG. 9c is a view along line J—J of FIG. 9a;

FIGS. 10a and 10b are views of a fabricated tee wherein the axes of the strut and bearing member do not intersect, FIG. 10b being a view along line K—K of FIG. 10a;

FIG. 11b is a view along line L—L of FIG. 11a.

DETAILED DESCRIPTION

Figure 5A:
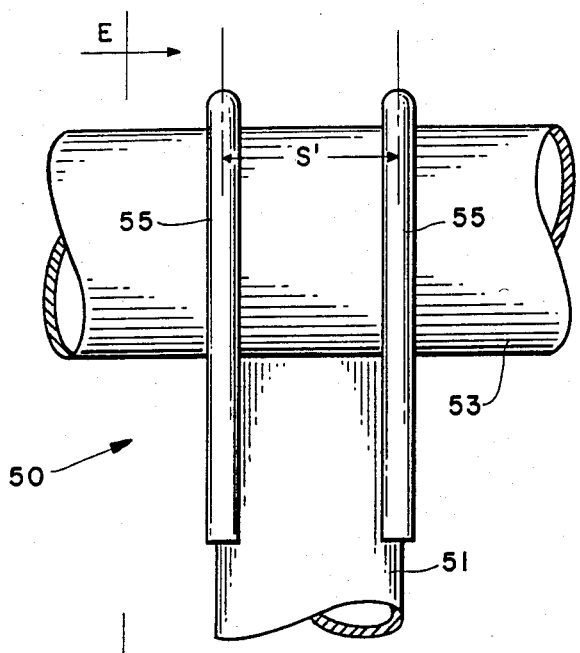
FIG. 5a is an elevational view of a tee similar to the FIG. 1 embodiment wherein two cylindrical structural members of different diameters are joined.

Referring now to FIGS. 1-3, shown therein are the various views of one embodiment of a fabricated tee 10 of the present invention wherein two cylindrical (tubular) structural members of different diameters are joined. FIG. 1 is an elevational view of tee 10, and FIGS. 2 and 3 are views along lines B—B and C—C, respectively. Tee 10 comprises two structural members joined in abutting relationship as shown in FIGS. 1-3; strut 11 comprises the vertical supporting member on which a horizontally disposed load bearing member 13 is held in abutting relationship. It must be understood at the outset that in the embodiment of FIGS. 1-3, as in the embodiments of all remaining figures hereinafter described, the vertical and horizontal members may be interchanged to form a tee which may best be illustrated by rotating FIGS. 1-3 90° in the plane of the drawings wherein a horizontal member abuts the vertical member, the teachings and claims herein including these configurations in all described embodiments. Further, the structural members comprising the fabricated tee of the present invention in any of the embodiments included within the scope of the teachings and defined by the appended claims may comprise any suitable material of construction (such as pipe, bar or tube stock) and may be of any suitable solid or tubular configuration (i.e., of circular, rectangular, or other cross section, or any combination of cross sections), so long as the structural members are joinable according to the teachings herein. In the embodiment represented by tee 10, strut 11 has a larger diameter than bearing member 13, although the relative diameters of the two structural members are not critical, as will be further developed hereinafter. Strut 11 and bearing member 13 are held in abutting relationship as shown in FIGS. 1-3 by one or a pair of U-shaped members 15 each formed with a 180° arcuate portion in the form of a bend having a diameter of curvature d (FIG. 3) corresponding to the outer diameter and surface of bearing member 13, and each having a pair of parallel leg portions 15a,b of predetermined length to extend along strut 11 any convenient length l. U members 15 preferably comprise round stock of diameter suitable for the required strength of the fabricated tee, but may comprise pipe or tube stock or bar stock of rectangular cross section. U members 15 are axially spaced along bearing member 13 a distance s (FIG. 2) with respect to each other so that legs 15a,b of each U member 15 contact strut 11 along length 1, the exact value of s being related to the diameters of strut 11, bearing member 13 and U members 15 and being readily calculable using usual geometric relationships. Each U member 15 is joined to strut 11 and bearing member 13 by a pair of welds 16, 17 on one or both sides of each U member 15 at the respective lines of contact with strut 11 and bearing member 13; weld 16 is performed along any desired, but preferably a substantial, portion of the line of contact between each U member 15 and bearing member 13, and weld 17 is performed along any desired, but preferably a substantial, portion of the line of contact (length l) between each leg 15a,b and strut 11. In the fabrication of tee 10, strut 11 and bearing member 13 may initially be held in the desired abutting relationship by a tack weld 19, prior to the assembly thereto of U members 15, although weld 19 may be performed in manner to add substantial structural strength to tee 10. Welds 16,17 and other welds described relative to hereinbelow described embodiments may be made by any conventional welding, brazing, or soldering technique, as would occur to one with skill in the applicable field, considering the sizes of structural elements to be joined, materials comprising the component structural members, and intended function of the tee. The specific welding process is therefore not limiting of the present invention.

The ability of a structural tee fabricated according to these teachings to resist loads in twisting, bending, shearing and tension and any combination of these is not limited by the strength of the U members comprising the tee, nor by the strength of the structural welds 16,17, but by the strengths of strut 11 and bearing member 13. The strengths of strut 11 and bearing member 13 are functions of the respective diameters, wall thicknesses and materials of construction. To resist a calculated structural load, U members 15 will preferably comprise rod of sufficient diameter and include legs 15a,b of predetermined length to provide welds of correspondingly suitable strength. The spacing (distance s) between U members 15 provides strength in the tee to resist torque or twisting and bending loads between strut 11 and bearing member 13. The diameter of the U member stock provides resistance to shearing and tension. The lengths of welds 16,17 provide load resistance in all modes. In many cases, some of the structural welds 16,17 may be omitted when the ultimate strength of the tee is dependent primarily on the distortion of strut 11 of bearing member 13. For example, as suggested above, welds 16,17 may be laid on one side only of each U member 15 while retaining desirable predetermined strength for the tee. In most subsequent figures herein presented, welds have been omitted so that the component structural members of each embodiment may be shown more clearly.

Reference is now made to FIGS. 4a and 4b. FIG. 4a is an elevational view of fabricated tee 40, wherein two cylindrical (tubular) structural members of substantially equal diameters are joined. FIG. 4b is a view along line D—D of FIG. 4a. In the structure depicted in FIGS. 4a, b, strut 41 and bearing member 43 are held in abutting relationship similar to that described for tee 10 of FIG. 1. U member 45 is similar to one of the U members 15 of FIG. 1 and comprises a section of bar stock or the like formed with a 180° bend with a diameter of curvature (FIG. 4b) corresponding to the outer diameter of bearing member 43 and having a pair of parallel leg portions 45a,b of predetermined length to extend along and diametrically of strut 41. Because strut 41 and bearing member 43 have substantially equal diameters, inclusion of but one U member 45 is appropriate, and it may be preferable to augment the strength of the tee by adding two corner members 46,47 diametrically of strut member 41 and in quadrature to leg portions 45a,b, and welded to strut 41 and bearing member 43 at welds 46a,b and 47a,b. Corner members 46,47 may be of the same rod material as U member 45, or other material suitable for the purpose as would occur to the skilled artisan.

Figure 5B:
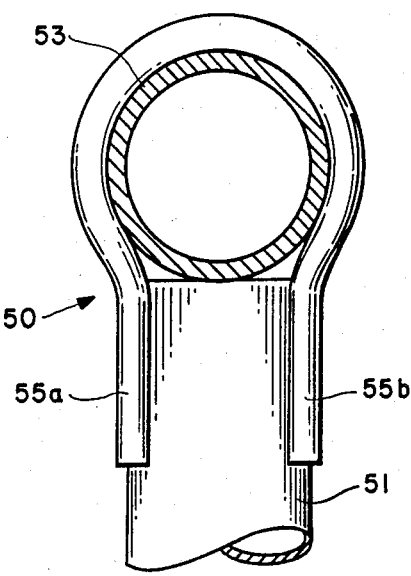

Reference is now made to FIGS. 5a and 5b wherein a cylindrical (tubular) bearing member 53 is joined to a strut 51 of relatively smaller diameter. FIG. 5b is a view along line E—E of FIG. 5a. In the structure depicted in FIGS. 5a, b, strut 51 and bearing member 53 are held in abutting relationship similar to that described for tee 10 of FIG. 1. In the embodiment of FIGS. 5a, b, however, a pair of U members 55 are included, each formed with a bend exceeding 180° and having a diameter of curvature (FIG. 5b) corresponding to the outer diameter of bearing member 53; each U member 55 terminates at the respective ends with a pair of parallel leg portions 55a,b of predetermined length for welding along strut 51. In an alternative embodiment, U members 55 of the described shape may be used to join structural members 51,53 of substantially equal diameters. U members 55 are axially spaced along bearing member 53 a predetermined distance s' (FIG. 5a) dependent on the degree of curvature of U members 55, the diameter of strut 51 and bearing member 53, and the diameter of the stock comprising U members 55; s' is readily calculable using usual geometric relationships. Spacings s' may be selected at any value consistent with the sizes of structural members 51,53, but may preferably be equal to the spacing between legs 55a,b, which spacing may maximize the strength of the tee to resist certain loads.

Figure 6:
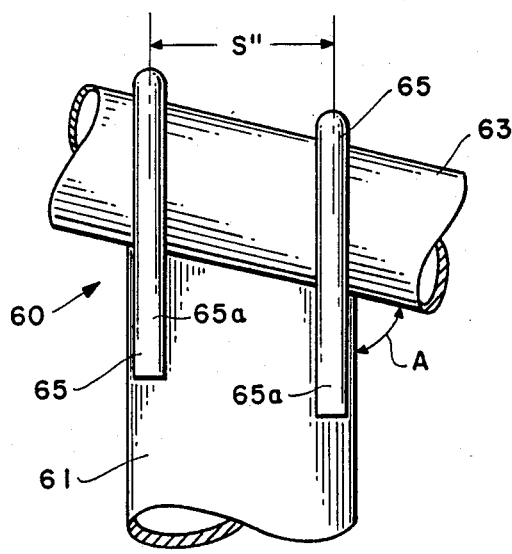
FIG. 6 is an elevational view of a fabricated tee wherein two structural members of different diameters are joined at an angle of abutment different from 90°.

Referring now to FIG. 6, shown therein is an elevational view of fabricated tee 60, wherein two structural members of different diameters are joined non-perpendicularly, viz., at an angle A of abutment different from 90°. The abutting end of strut 61 may be cut at any desirable angle to dispose bearing member 63 at a predetermined corresponding angle. It is noted, however, that when a cylindrical member is cut at an angle other than 90°, the cut end is elliptical, and in the assembly and welding of tee 60, the axis of bearing member 63 is aligned with the major axis of the ellipse defined by the cut end of strut 61. U members 65 are configured similarly to U members 15 or 55, spaced along bearing member 63 a distance s" dependent on the diameters of strut 61, bearing member 63 and U members 65, and welded around bearing member 63 and along strut 61 with legs 65a,b parallel to the axis of strut 61. The spacing s" of U members 65 corresponds to that of tees 10,50, and, consequently, is characterized by approximately the same resistance to twisting and bending loads as that which characterizes tees 10,50. The resistance to twisting of tee 60 may, however, be substantially less than that of a 90° tee due to the relatively larger unwelded portions of each leg 65a,b immediately adjacent the abutting surfaces of members 61,63. If this results in less than the desired strength for tee 60 for a particular application, it may be appropriate to select larger diameter bar stock material for U members 65. As in the embodiment of FIG. 1, the ultimate strength of tee 60 is dependent on the degree of distortion imposed upon strut 61 and bearing member 63.

In the fabrication of tee 60 having an angle A reasonably close to 90° (i.e., not less than about 60°), the usual method of bending the bar stock material to form U members 65 will provide a reasonably close fit between U members 65 and bearing member 63. Specifically, it would be a normal procedure to bend the U member material in a direction normal to the axis of a cylinder having a diameter equal to that of bearing member 63. But when angle A becomes somewhat less than about 60°, the curve that U member 65 must follow on the surface of bearing member 63 becomes elliptical and may result in a gap between each U member 65 and the surface of bearing member 63 which is excessively large to be effectively filled with weld material to retain acceptable strength for tee 60. To effectively eliminate this gap, the U member material may preferably be bent on a bias with respect to the axis of bearing member 63 instead of normal to the axis as just described.

Tee 60 is characterized by an advantage that strut 61 and bearing member 63 may be assembled at numerous different angles A without cutting the end of strut 61 at those precise specified angles. This provides certain economies in cutting strut 61, since, for example, for some tees requiring an angle A of about 80° and other tees requiring an angle of about 75°, tees 60 having either angle can be made from struts 61 previously cut at an angle of about 70° and otherwise held at the desired angle during welding. This precept may be further illustrated by two extreme cases: if the axis of bearing member 63 is aligned with the major axis of the ellipse projected on the end of the strut 61, then angle A therebetween will be 70°—the same as the angle of the cut; on the other extreme, if the axis of bearing member 63 is aligned with the minor axis of the ellipse, then angle A will be 90°. It then follows that with various alignments, any angle between about 70° and 90° can be obtained for an end cut on strut 61 of 70°. The required deviation of the alignment axis from the major axis of the ellipse may be calculated using geometric principles. In view of the foregoing, tee 60 may have somewhat reduced strength if the deviation angle is excessive, which may be overcome by using large bar stock material for U members 65.

Referring now to FIG. 7a shown therein is a fabricated tee 70 which comprises a short strut segment 71 joined to a short bearing member segment 73 in abutting relationship using a pair of U members 75. FIG. 7b is a view along line G—G of FIG. 7a. Strut segment 71 and bearing member segment 73 are of any desired preselected length, and comprise tubular stock of inner diameters sufficient to slideably receive strut insert 78 and journal member 79, respectively, each of any preselected overall length. Tee 70 therefore comprises a unit which can be fabricated without regard to the lengths of strut insert 78 and journal member 79 ultimately to be utilized. This provides certain economies in quantity fabrication of tee 70, and further provides an embodiment wherein journal member 79 may be configured to be rotatable within bearing member segment 73. The invention as embodied in tee 70 may therefore be used as a structural hinge in applications where adjustment of equipment requires rotation between a bearing member and strut segment. It is further noted that bearing member segment 73 may be configured to house a race to support a bearing for journal member 79 when continuous rotation between journal member 79 and bearing member segment 73 is desired.

In applications where tee 70 is utilized as a structural joint between strut insert 78 and journal member 79, means may be provided on tee 70 to removably attach strut insert 78 and journal member 79 thereto. Accordingly, holes 76,77 may be provided diametrically of and through strut segment 71 and bearing member segment 73 to receive holding means such as bolts 76a,77a, clevis pins, or the like (FIG. 7b) through registering holes in structural members 78,79. Other arrangements of elements of the FIG. 7a, b embodiment may be assembled in accordance with these teachings to provide alternate functions of the structural joint. For example, if rotation between journal member 79 and bearing member segment 73 is desired, but without axial movement therebetween, two collars (not shown) on journal member 79 may be provided, one on each side of bearing member segment 73, which collars may be short segments of the material comprising bearing member segment 73, and held in the appropriate place adjacent the ends of bearing member segment 73 on journal member 79 using bolts, clevis pins or the like (not shown).

Figure 8B:
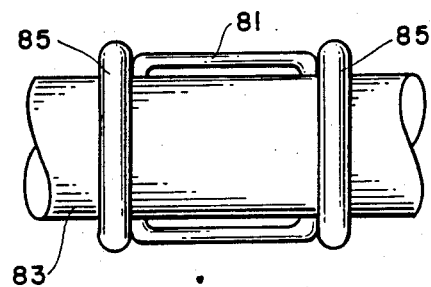
Figure 8A:
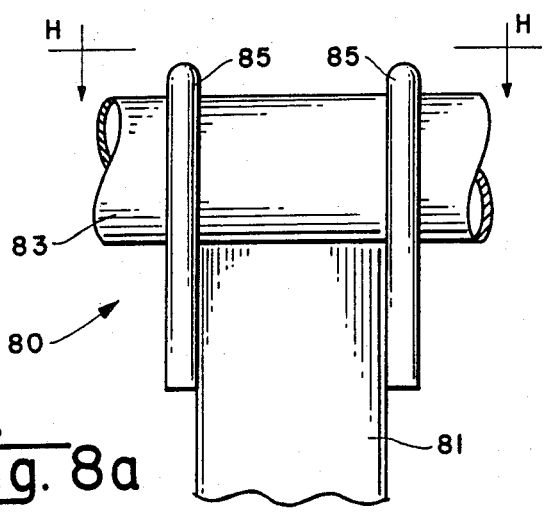
FIG. 8a is an elevational view of a fabricated tee wherein a tubular strut of rectangular cross section is joined to a cylindrical bearing member.

Reference is now made to FIGS. 8a and 8b, wherein a tubular strut 81 of rectangular cross section is joined to a cylindrical bearing member 83. FIG. 8b is a view along line H—H of FIG. 8a. Strut 81 and bearing member 83 are held in abutting relationship in manner similar to that for tee 10 of FIG. 1. In the embodiment of FIGS. 8a, b, however, U members 85 may, depending on the dimensions of strut 81 and bearing member 83, have shape similar to that of U members 15 of FIG. 1 or that of U members 55 of FIG. 5, and may have both legs of each U member 85 welded to a single side of strut 81 (as depicted in FIGS. 8a, b), or, if bearing member 83 is larger in diameter than the edges of strut 81, to opposite sides of strut 81 whereby each U member 85 straddles the abutting end of strut 81. The exact welding location of U members 85 in fabricated tee 80 depends upon the cross-sectional configurations and relative sizes selected for structural elements 81,83.

Reference is now made to FIGS. 9a, 9b and 9c, wherein strut 91 includes section 92 which is parallel to bearing member 93. FIG. 9b is a view along line I—I of FIG. 9a, and FIG. 9c is a view along line J—J. Two configurations for U member 95 are illustrated for holding bearing member 93 in position against segment 92 or strut 91. In FIG. 9b, U member 95b is shaped similarly to U member 15 of FIG. 1, and welded in place similarly to U member 85 of FIGS. 8a, b. In FIG. 9c, U member 95c is shaped with a primary angle of bend less than 180°, and the legs of U member 95c are bent to conform to and contact the sides of strut section 92 and welded in place straddling both structural elements 92,93. Alternatively, depending on the relative dimensions of strut section 91 or 92 and bearing member 93, U member 95b of FIG. 9b may have a shape similar to that of U members 55 of FIG. 5, and may be welded with both legs joining a single side of strut 91. As in the embodiment of FIGS. 8a, b, the exact location of welding U members 95 depends upon the cross-sectional configurations and relative sizes selected for structural elements 91,92,93.

Figure 10A:
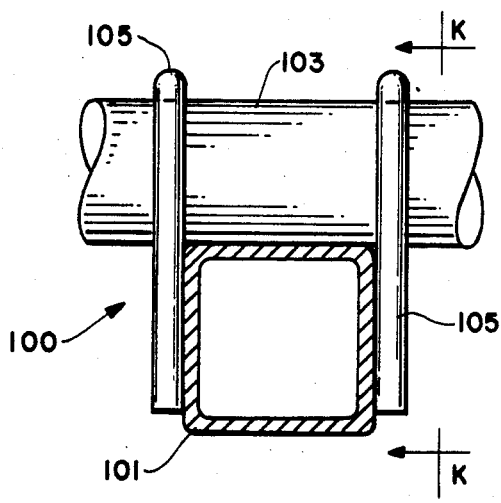
Figure 10B:
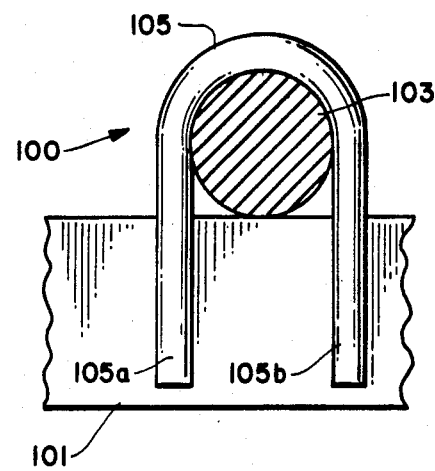

Referring now to FIGS. 10a and 10b, shown are two views of tee 100 wherein the axes of strut 101 and bearing member 103 do not intersect, and the strut and bearing members join tangentially. FIG. 10b is a view along line K—K of FIG. 10a. In the structure of tee 100, U members 105 are preferably shaped like U members 15 of FIG. 1, and welded in place straddling both structural elements 101,103. It is instructive to note that the configuration of FIGS. 10a, b may be used for structural elements 101,103 which join at an angle other than 90° as illustrated in FIGS. 10a, b. In this case, for a bearing member of circular cross section and an angle of intersection substantially different from 90°, U members 105 may preferably be elliptically shaped similar to that described in part for U members 65 of FIG. 6, except that U members 105 would span the major axis of the ellipse with the spacing between legs 105a,b exceeding the diameter of bearing member 103, whereas legs 65a,b of tee 60 span a minor axis of the ellipse with the spacing therebetween equal to the diameter of bearing member 63.

Figure 11A:
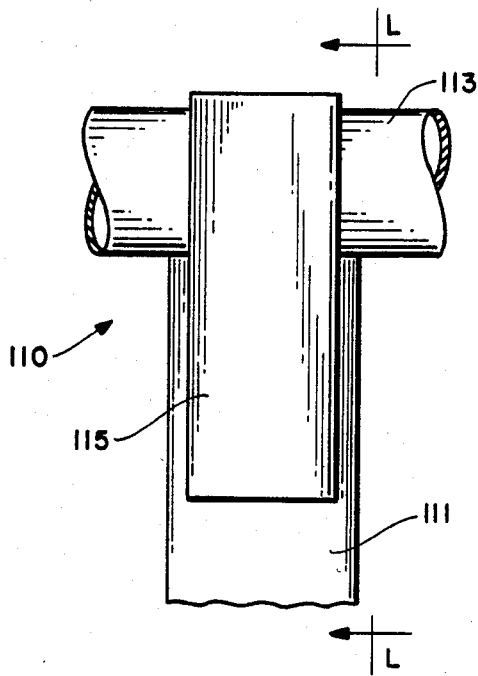
FIG. 11a is an elevational view of a fabricated tee including a U member structure in the form of a strap.
Figure 11B:
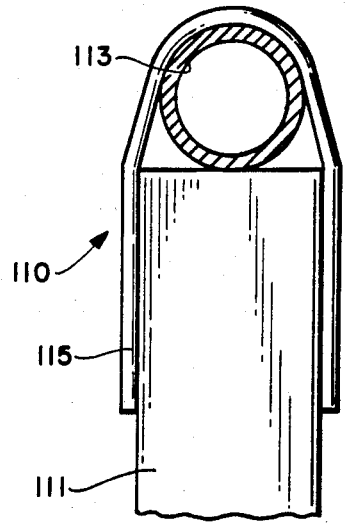

FIGS. 11a and 11b show tee 110 including an alternative U member structure for attaching bearing member 113 of substantially any cross section to a strut 111 of rectangular cross section. FIG. 11b is a view along line L—L of FIG. 11a. The U member is a flat strap 115 of width greater than the diameter of the U members of previously described embodiments. A single strap element 115 may be utilized in place of a pair of U members of previously described embodiments, such as those of FIGS. 8a and 9a. In addition to the cross-sectional shape illustrated in the view of FIG. 11b, strap 115 may have shape similar to U member 15 of FIG. 3 or U member 55 of FIG. 5b. Strap 115 may be preferable for joining structural members 83,85 of FIGS. 8a, b in order to cover the abutting end of strut 81.

In accordance with the foregoing teachings, an improved fabricated structural tee and method of making same is described. It is understood that certain modifications to the invention as described may be made, as might occur to one with skill in the field of the invention, within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. A structural joint comprising:
    (a) a transverse member of substantially circular cross section and having first and second ends thereof;
    (b) a strut member of substantially circular cross section having one end abutting said transverse member intermediate said first and second ends thereof, wherein said strut member has an outer diameter larger than said transverse member and wherein the longitudinal axes of said transverse member and said strut member substantially intersect; and
    (c) first and second U members each having first and second ends, said U members disposed around said transverse member in predetermined spaced relationship to each other along said transverse member and welded to said transverse member and to said strut member with said strut member generally between said U members, each U member having a generally arcuate portion intermediate said first and second ends thereof conforming to the outer surface contour of said transverse member and a pair of substantially straight portions near respective said first and second ends thereof, said straight portions defining a pair of substantially parallel legs having predetermined length and spacing and being welded to said strut member.

2. The structural joint as recited in claim 1 wherein the longitudinal axes of said transverse member and said strut member intersect at an acute angle, and wherein said arcuate portion of each said U member is generally semielliptical in shape whereby said U members conform generally to the outer surface contour of said transverse member when disposed at said angle to the longitudinal axis of said transverse member, said U members disposed in predetermined spaced relationship to each other along said transverse member and welded to said transverse member at said angle and to said strut member with said strut member generally between said U members.

3. The structural joint as recited in claim 1 wherein said transverse member and said strut member are tubular.

4. The structural joint as recited in claim 3 wherein said transverse member and said strut member are tubular segments.

5. A structural joint comprising:
    (a) a transverse member of substantially circular cross section and having first and second ends thereof;
    (b) a strut member of substantially circular cross section having one end abutting said transverse member intermediate said first and second ends thereof, wherein said strut member has an outer diameter equal to or smaller than that of said transverse member and wherein the longitudinal axes of said transverse member and said strut member substantially intersect; and
    (c) first and second U members each having first and second ends, each U member having a generally arcuate portion intermediate said first and second ends thereof conforming to the outer surface contour of said transverse member and a pair of substantially straight portions near respective said first and second ends thereof, said arcuate portion generally exceeding 180° and including a pair of oppositely directed bends at respective ends of said arcuate portion whereby said straight portions define a pair of spaced generally parallel legs of predetermined length and spacing, said U members disposed around said transverse member in predetermined spaced relationship to each other along said transverse member and welded to said transverse member and to said strut member with said strut member generally between said U members.

6. The structural joint as recited in claim 5 wherein the longitudinal axes of said transverse member and said strut member intersect at an acute angle, and wherein said arcuate portion of each said U member is generally semielliptical in shape whereby said U members conform generally to the outer surface contour of said transverse member when disposed at said angle to the longitudinal axis of said transverse member, said U members disposed in predetermined spaced relationship to each other along said transverse member and welded to said transverse member at said angle and to said strut member with said strut member generally between said U members.

7. The structural joint as recited in claim 5 wherein said transverse member and said strut member are tubular.

8. A structural joint comprising:
    (a) a transverse member of substantially circular cross section and having first and second ends thereof;
    (b) a strut member of substantially square cross section having an edge dimension thereof equal to or larger than the diameter of said transverse member and having one end abutting said transverse member intermediate said first and second ends thereof, and wherein the longitudinal axes of said transverse member and said strut member substantially intersect; and
    (c) first and second U members each having first and second ends, said U members disposed around said transverse member in predetermined spaced relationship to each other along said transverse member and welded to said transverse member and to said strut member with said strut member generally between said U members, each U member having a generally arcuate portion intermediate said first and second ends thereof conforming to the outer surface contour of said transverse member and a pair of substantially straight portions near respective said first and second ends thereof, said straight portions defining a pair of substantially parallel legs having predetermined length and spacing and being welded to said strut member.

9. The structural joint as recited in claim 8 wherein said transverse member and said strut member are tubular.

* * * * *